J. GIRE.
Grain Drill.
No. 107,359.                    Patented Sept. 13, 1870.
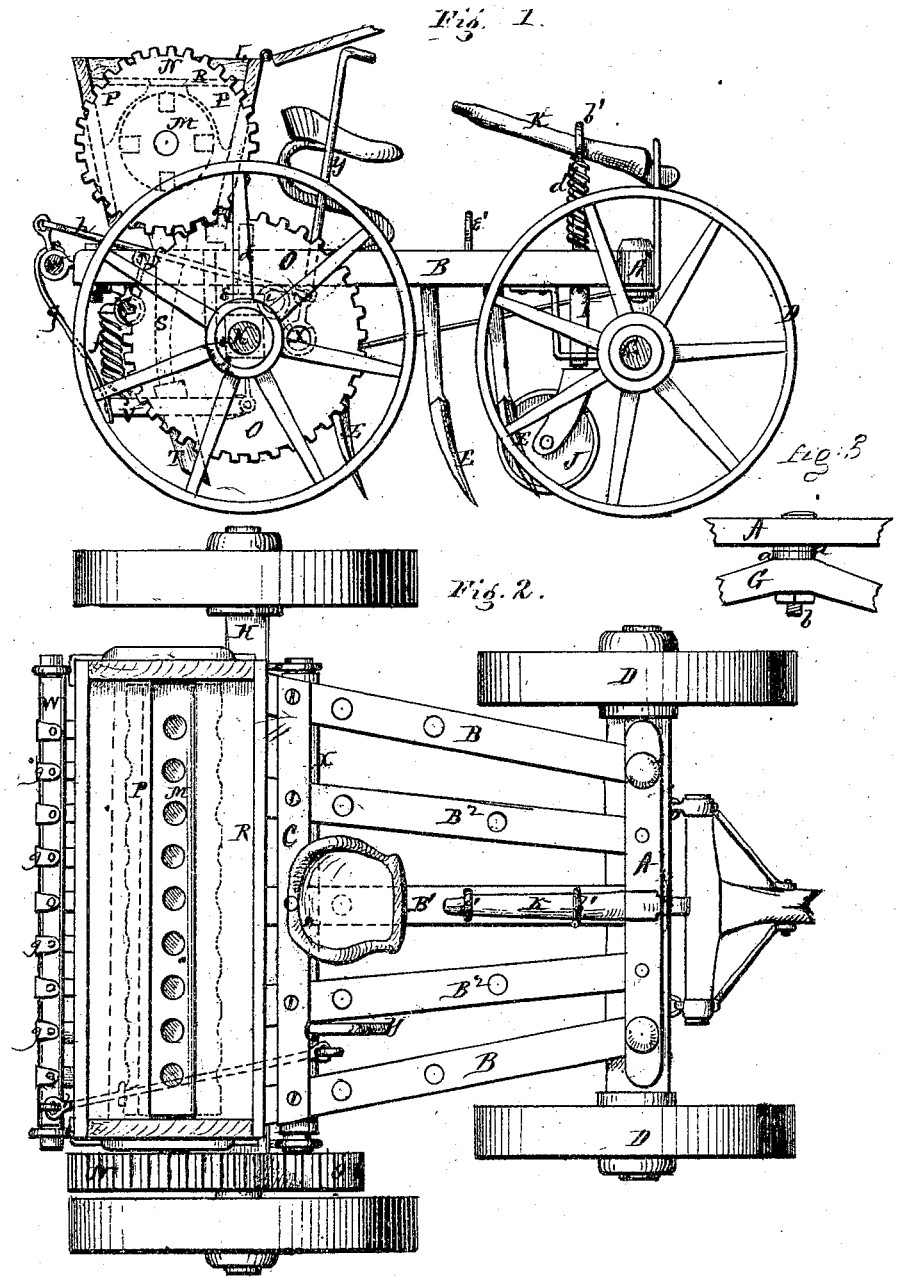

UNITED STATES PATENT OFFICE.

JOHN GIRE, OF SIPTON, ILLINOIS.

Letters Patent No. 107,359, dated September 13, 1870.

IMPROVEMENT IN COMBINED CULTIVATOR AND GRAIN-DRILL.

The Schedule referred to in these Letters Patent and making part of the same.

*To all whom it may concern:*

Be it known that I, JOHN GIRE, of the town of Sipton, in the county of Fayette, and in the State of Illinois, have invented certain new and useful Improvements in Combined Cultivator and Grain-Drill; and do hereby declare that the following is a full, clear, and exact description thereof, reference being had to the accompanying drawing, and to the letters of reference marked thereon making a part of this specification.

The nature of my invention consists in the construction and arrangement of a "combined cultivator and grain-drill," as will be hereinafter fully set forth.

In order to enable others skilled in the art to which my invention appertains to make and use the same, I will now proceed to describe its construction and operation, referring to the annexed drawing, in which—

Figure 1 is a side view, and

Figure 2 a plan view of my machine.

Figure 3 is a front view of the center of the forward axle.

A represents the front bolster, to which the side beams B B, center beam B$^1$, and intermediate beams B$^2$ B$^2$ are secured, all of said beams being connected by means of a cross-bar, C, as shown in fig. 2, and form the frame of my machine.

This frame, with the entire machine, is supported on four wheels, the front wheels D D supporting the weight, which in other drills or cultivators is upon the horses' necks.

To the beams B, B$^1$, and B$^2$, the cultivator-teeth E E are attached in any suitable manner.

The front bolster A is supported upon the forward axle G, one or more washers, a, being inserted between them, as shown in fig. 3, and the king-bolt b passing through them.

By means of these washers the depth at which the teeth E E are to work may be easily regulated.

The hind part of the frame or carriage is regulated by nuts e e upon screw-bolts d d, said bolts extending upward from the hind axle H, and passing through the side beams B B, which rest upon the nuts e e.

Through the front end of the center beam B$^1$ passes a rod, I, which rod also passes through a loop or brace under the frame, and is at its lower end provided with a swiveled wheel, J.

At the upper end of the rod I is a ring, b', through which passes a lever, K, pivoted in a standard on the front bolster A.

A spring, d', is placed around the rod I, between the beam B$^1$ and the ring b', which spring raises the rod and wheel up.

By pressing down upon the lever K, and fastening the end of the same in the hook e', the wheel J is lowered so as to raise the front carriage and turn the machine upon.

On the rear ends of the side beams B B the seed-box L is attached, in any suitable manner, so that it can be readily removed at will.

In this box is a roller, M, which is operated by means of a cog-wheel, N, attached to one of its journals, and meshing with another cog-wheel, O, upon the rear axle H.

The roller M is on its circumference provided with four rows of holes running lengthwise on the roller, as shown in fig. 2.

Above and on each side of said roller, in the box L, is a piece, P, which leaves just room enough between their inner edges for the seed to pass down and fill the cavities in the roller.

On said pieces P P a piece of rubber, R, perforated to correspond with the holes in the roller and the grain, is laid on top of said rubber sheet.

In the bottom of the seed-box L are corresponding openings, from which conductors, S, lead to the shoes, T, each of said shoes being secured in a lever, V.

All of the levers b are pivoted on one rod, and pressed downward by means of springs, f, shown in fig. 1.

The rear ends of the levers or arms V are connected, by straps, g, to a shaft, w, which is pivoted in or at the rear ends of the side beams B B.

This shaft is, by a rod, h, connected with an arm on the shaft X, which is pivoted in front of the rear axle M.

The shaft X is provided with a lever, Y, by means of which the arms V and shoes T may be raised up at any time by the driver.

The rod h also operates an arm on the shaft Z, to which the upper ends of the springs f are attached, and raising said springs at the same time as the arms V.

On the shaft X are also secured two cams or screw-eyes, i, which, when said shaft is turned by the lever Y, raise the rear end of the frame, disengaging the cog-wheels N and O, thus stopping the operation of the drill.

The grain-box L, with its attachments, may be readily removed, and the machine used as a corn-cultivator, if so desired.

Having thus fully described my invention,

What I claim as new, and desire to secure by Letters Patent, is—

1. The arrangement of the frame A B C, axles G H, washers a a, bolts d d, and nuts e e, all substantially as and for the purposes herein set forth.

2. The arrangement of the rod I, with wheel J, ring b', spring d', lever K, and hook e', all substantially as and for the purposes herein set forth.

3. The arrangement of the shoes T T, arms V V, straps g g, springs f f, shafts W X Z, rod h, and lever Y, all substantially as and for the purposes herein set forth.

In testimony that I claim the foregoing, I have hereunto set my hand this 14th day of April, 1870.

JOHN GIRE.

Witnesses:
WILLIAM FLOWERS,
FREDRICK ZEITLER.